United States Patent
Meyer

(10) Patent No.: US 6,435,056 B2
(45) Date of Patent: *Aug. 20, 2002

(54) CABLE ASSEMBLY HAVING AN INTERLOCKING DEVICE AND AN ADJUSTMENT DEVICE

(75) Inventor: Klemens J. Meyer, Northville, MI (US)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/886,630

(22) Filed: Jun. 21, 2001

Related U.S. Application Data

(62) Division of application No. 09/443,792, filed on Nov. 19, 1999, now Pat. No. 6,282,979.

(51) Int. Cl.7 .............................. F16C 1/10; F16B 7/10
(52) U.S. Cl. .................. 74/502.4; 74/502.6; 74/500.5; 74/501.5 R; 403/319; 403/379.1; 403/104
(58) Field of Search ............................ 74/502.4, 502.6, 74/500.5, 501.5 R; 403/319, 379.1, 104

(56) References Cited

U.S. PATENT DOCUMENTS

| | | | |
|---|---|---|---|
| 4,987,968 A | 1/1991 | Martus et al. | |
| 5,076,114 A | 12/1991 | Moody | |
| 5,176,231 A | 1/1993 | Moody et al. | |
| 5,199,321 A | * 4/1993 | Nowak | 74/502.6 |
| 5,383,377 A | * 1/1995 | Boike | 74/502 |
| 5,489,246 A | 2/1996 | Moody et al. | |
| 5,522,277 A | 6/1996 | Bollinger | |
| 5,584,212 A | 12/1996 | Wild | |
| 5,588,334 A | 12/1996 | Lu et al. | |
| 5,598,743 A | 2/1997 | Yasuda | |
| 5,647,818 A | 7/1997 | Moody | |
| 5,655,415 A | * 8/1997 | Nagle et al. | 74/502.6 |
| 5,709,132 A | * 1/1998 | Irish et al. | 74/502.4 |
| 5,921,143 A | 7/1999 | Castillo et al. | |
| 5,934,150 A | 8/1999 | Srinivas et al. | |
| 6,109,132 A | 8/2000 | Frye | |

FOREIGN PATENT DOCUMENTS

| | | | |
|---|---|---|---|
| EP | 0244067 | * 11/1987 | 74/502.4 |

* cited by examiner

Primary Examiner—Vinh T. Luong
(74) Attorney, Agent, or Firm—Howard & Howard

(57) ABSTRACT

A cable assembly (11) has a conduit (12) and a core element (14) passing through the conduit (12). A terminal assembly (15) is secured to one end of the core element (14). The subject invention incorporates both an interlock device (46) and an adjustment device on the same cable assembly (11). The interlock device (46) is disposed adjacent the terminal assembly (15) and is movable between a release position allowing relative movement between the terminal assembly (15) and the interlock device (46) and an engaged position preventing the relative movement between the terminal assembly (15) and the interlock device (46). The adjustment device includes an adjustment housing (20) partially disposed about a base portion (28) for allowing axial adjustment of the base portion (28) to tension the core element (14). The adjustment device also includes a movable lock (36) slideably supported by the adjustment housing (20) and movable between an engaged position interconnecting the adjustment housing (20) to the base portion (28) and a disengaged position allowing the axial adjustment and the tensioning of the core element (14).

18 Claims, 6 Drawing Sheets

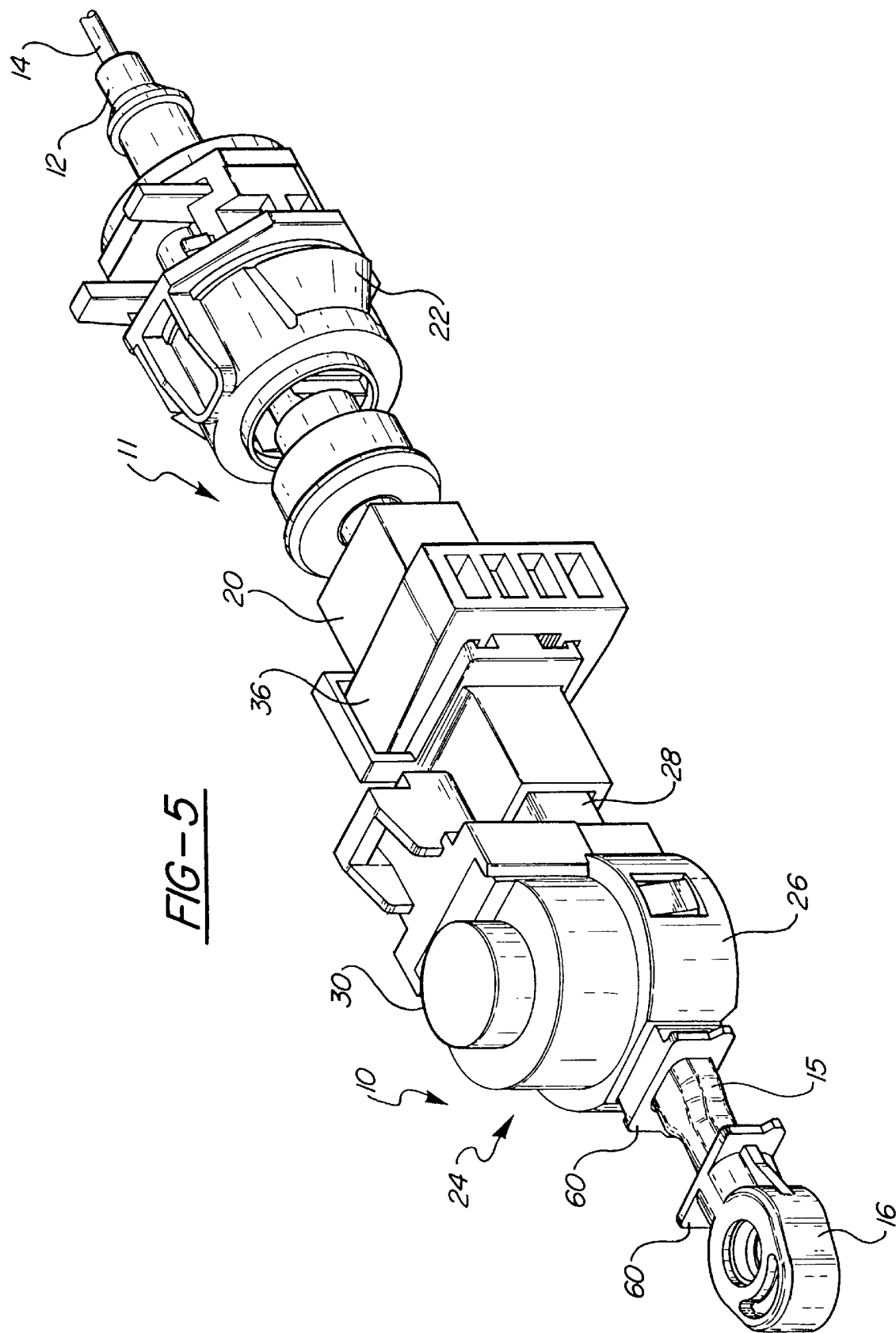

CABLE ASSEMBLY HAVING AN INTERLOCKING DEVICE AND AN ADJUSTMENT DEVICE

RELATED APPLICATION

The subject patent application is a divisional of U.S. patent application Ser. No. 09/443,792, which was filed on Nov. 19, 1999 now U.S. Pat. No. 6,282,979 issued on Sep. 4. 2001.

BACKGROUND OF THE INVENTION

1. Field of the Invention

The present invention relates to a shifter cable assembly having an interlock device integral therewith, and more specifically, to an adjustment assembly which ensures proper operation of the interlock device following installation of the cable assembly into the vehicle.

2. Description of the Prior Art

Interlock devices are incorporated into vehicle control mechanisms to prevent the transmission from being shifted out of the park position unless the brake pedal is depressed. Typically, the cable assembly includes a conduit with a core element movably disposed therein. One end of the core element is secured to the transmission and the other end of the core element is secured to the shifter, such as a column shift lever. The column shift lever transmits movement to the transmission through the core element. One type of interlock device operates by engaging an element associated with the core element to prevent its movement unless the brake pedal is depressed. This is achieved by utilizing a solenoid that is actuated by a brake pedal signal. It is desirable to provide an interlock device that is integral with the cable assembly to reduce the number of components required for the interlock system. To this end, interlock devices have been developed that are integral with the cable assembly and which utilize a pin transverse to an aperture associated with the core element. The pin engages the aperture to prevent its movement. Once such device is disclosed in U.S. Pat. No. 5,647,818 issued on Jul. 15, 1997 to Moody.

The alignment of the pin and aperture is critical to ensure proper operation of the interlock device. During installation of the cable assembly into the vehicle, the core element must be moved within the conduit to connect the ends of the cable assembly to their respective shifter components. As a result, the position of the aperture may change slightly with respect to the pin and cause the interlock device to operate improperly. Other interlock devices that are non-integral with the cable assembly do not present this alignment problem because the brackets that are used to support the components may align the features. Therefore, what is needed is an adjustment assembly to ensure proper operation of the integral shifter cable interlock after installation of the cable assembly into the vehicle.

SUMMARY OF THE INVENTION AND ADVANTAGES

The present invention provides a cable assembly having a conduit defining an axis. A core element is disposed within the conduit and is movable along the axis. A terminal assembly is secured to a portion of the core element and has an end connector. An interlock device is disposed adjacent the terminal assembly and is movable between a release position allowing relative movement between the terminal assembly and the interlock device and an engaged position preventing the relative movement between the terminal assembly and the interlock device. A base portion extends from the interlock device. An adjustment housing is at least partially disposed about the base portion for selectively allowing axial adjustment of the base portion and the interlock device relative to the adjustment housing to tension the core element. A movable lock is slideably supported by the adjustment housing and movable between an engaged position interconnecting the adjustment housing to the base portion to define a fixed position of the interlock device relative to the adjustment housing, and a disengaged position allowing relative movement between the adjustment housing and the base portion for providing the axial adjustment and the tensioning of the core element an adjustment assembly for an integral shifter cable interlock.

Accordingly, the present invention provides a cable assembly that includes both an interlock device used in automatic transmissions and an adjustment device for adjusting the tension in the cable. This combination of features is particularly advantageous in that the interlock device and adjustment device are mounted to a common cable assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a perspective view of the present invention similar to FIG. 1 in an installed position.

DETAILED DESCRIPTION OF THE PREFERRED EMBODIMENT

Figure 1:
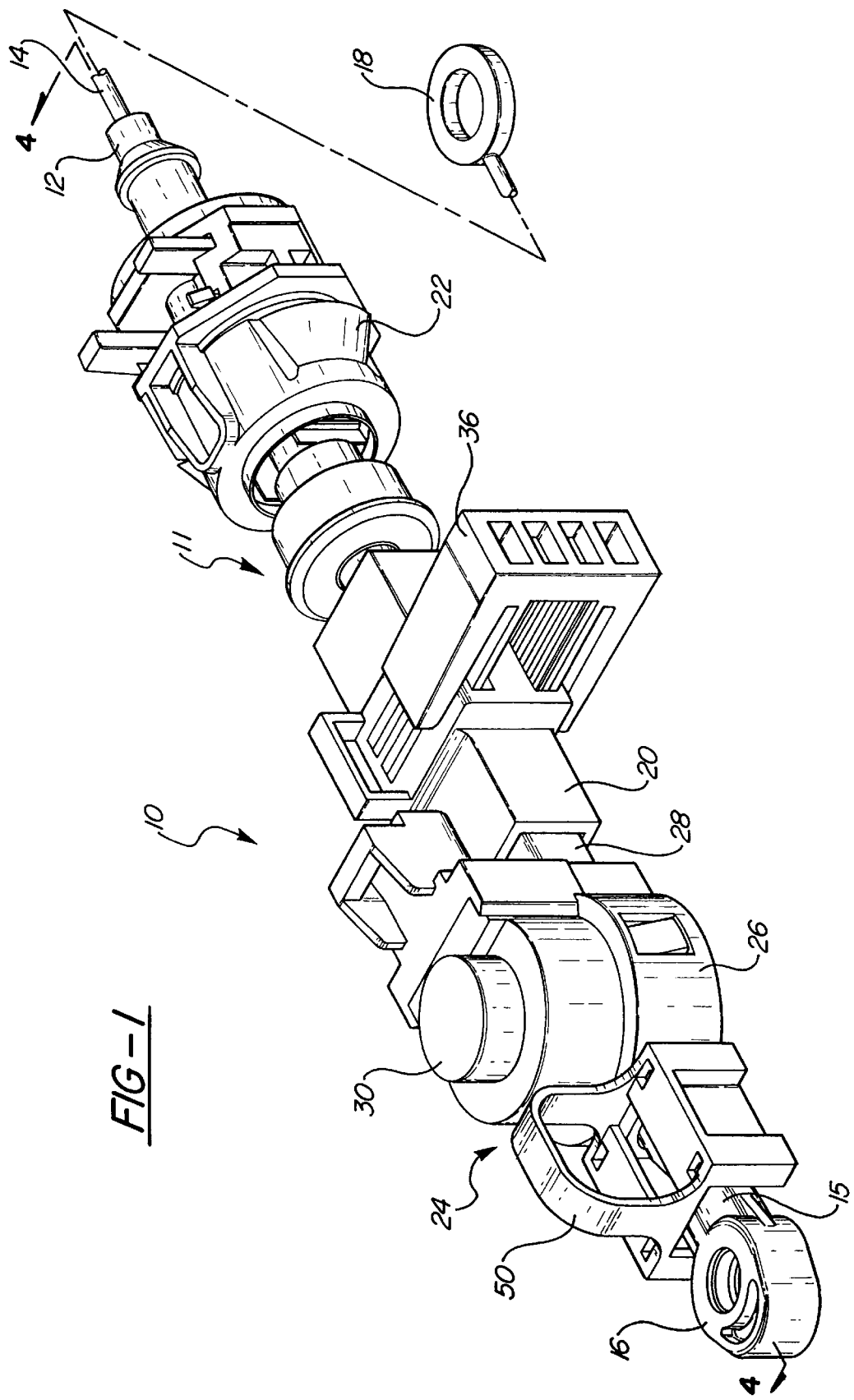
FIG. 1 is a perspective view of an adjustment assembly of the present invention on for an integral shifter cable interlock.

Referring to the Figures, wherein like numerals indicate like or corresponding parts throughout the several views, an adjustment assembly for an integral shifter cable interlock is generally shown at 10 in FIG. 1. The assembly 10 includes a cable assembly, generally shown at 11, having a conduit 12 defining an axis A and a core element 14 is disposed within the conduit 12 which is movable along the axis A. A terminal assembly 15 is secured to a portion of the core element 14. The terminal assembly 15 further includes an end connector 16 adapted for connection to a shifter (not shown), such as a column shifter. One end 18 of the core element 14 is secured to the transmission, as is known in the art, and the other end of the core element 14, which has the terminal assembly 15, is secured by the end connector 16 to the shifter, in a manner known in the art. The column shift lever transmits movement to the transmission through the core element 14.

Figure 2:
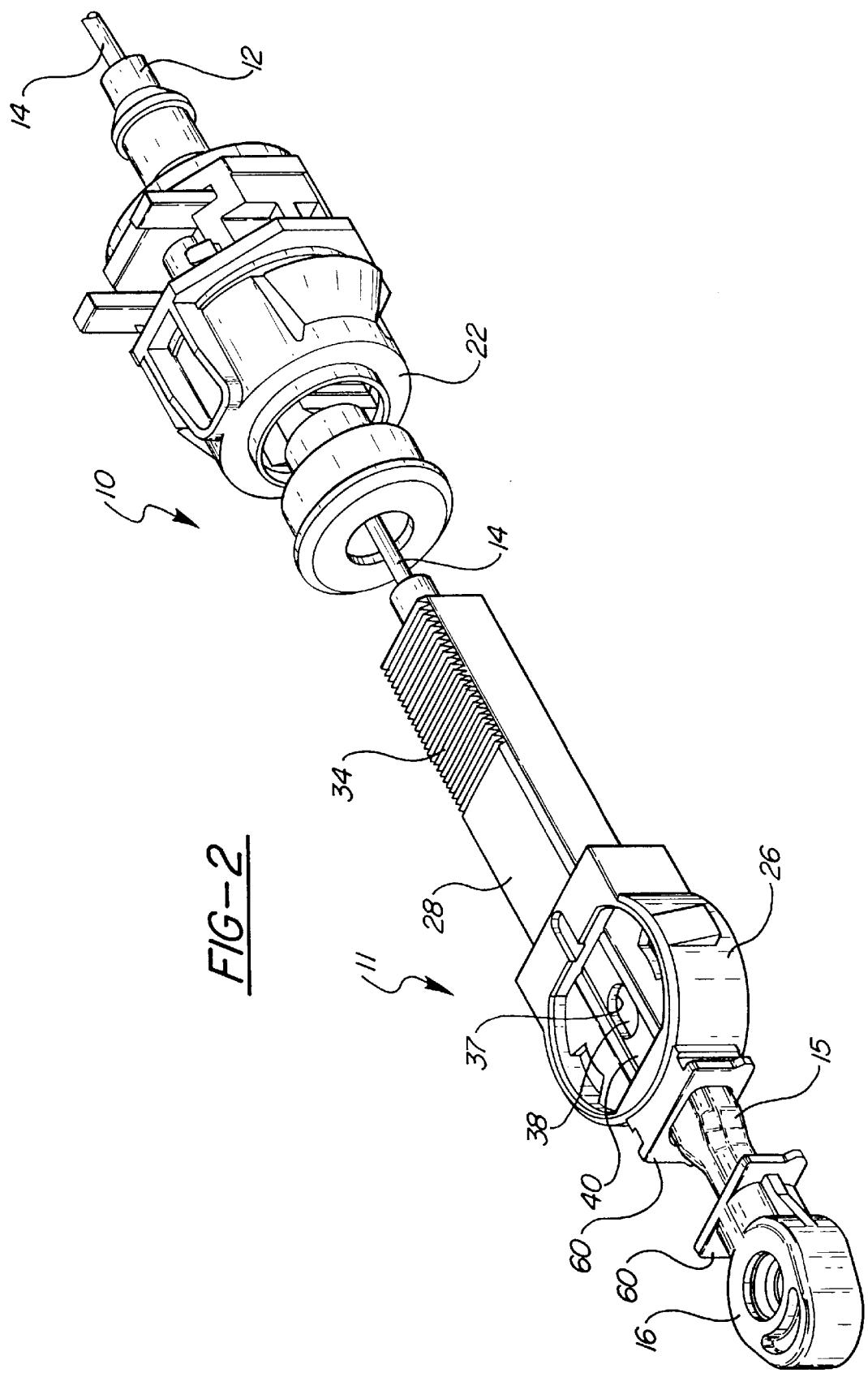
FIG. 2 is a perspective view of the present invention similar to FIG. 1 with a portion of an interlock housing and swivel tube removed.

The cable assembly 11 includes a swivel tube 20 that is pivotally connected to a mounting member 22. The mounting member 22 is connected to a support member (not shown) in a vehicle for supporting the cable assembly 11. The swivel tube 20 permits the end of the cable assembly 11 to be positioned for attachment to the shifter. An interlock housing, generally shown at 24, is supported on the cable assembly 11 and includes a lower portion 26 having a base portion 28 and an upper portion 30 which is secured to the lower portion 26. The base portion 28 is slideably received within the swivel tube 20, also labeled as an adjustment housing or second housing, and has a plurality of teeth 34 thereon, as best shown in FIG. 2. The swivel tube 20 supports a movable lock 36 for engaging the teeth 34 and preventing axial movement of the interlock housing 24 relative to the swivel tube 20. The swivel tube 20, base portion 28, and lock 36 cooperate to adjust the tension in the cable assembly 11 once it has been installed in the vehicle.

Figure 3:
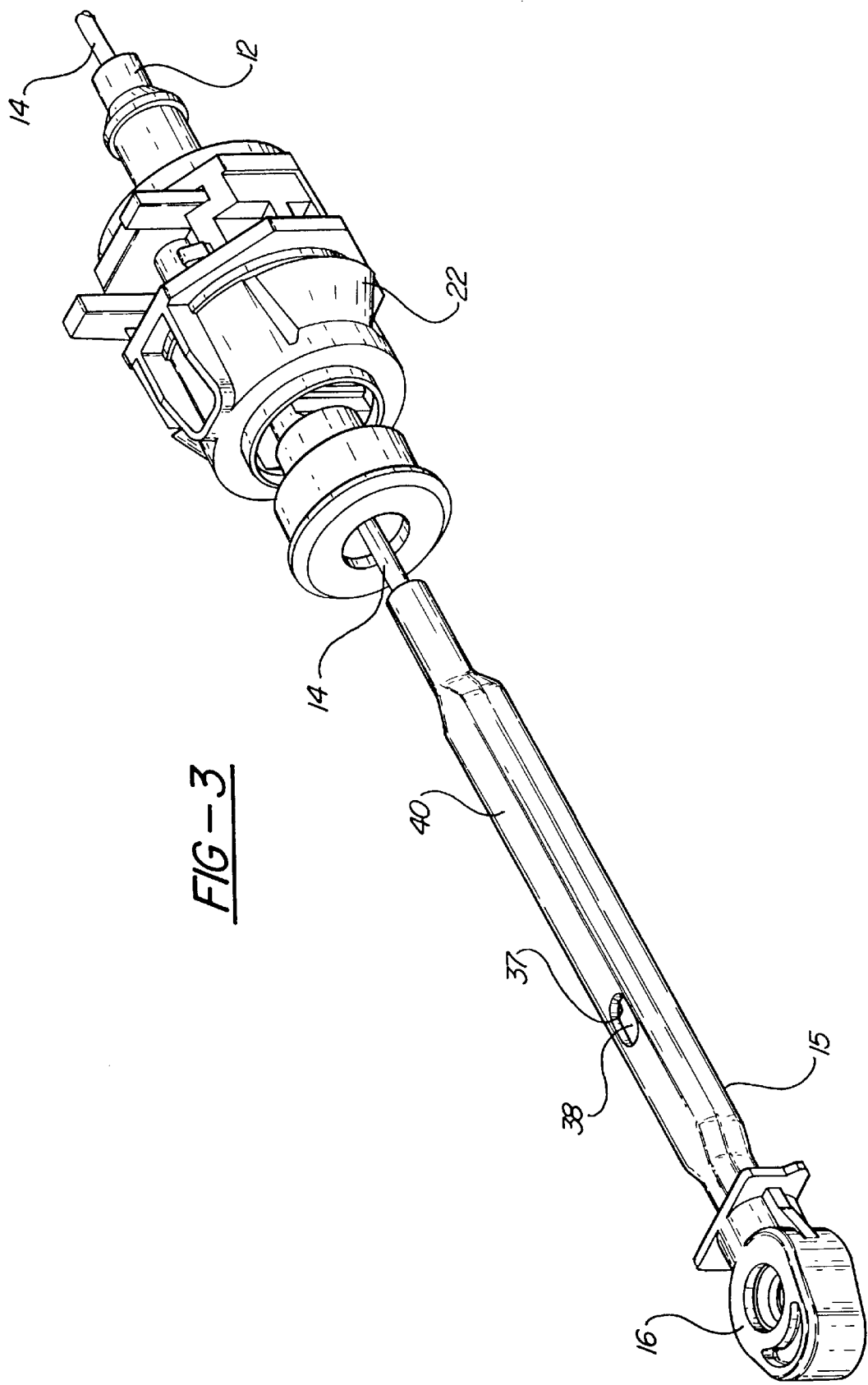
FIG. 3 is a perspective view of the present invention similar to FIG. 2 with another portion of the interlock housing removed.

Referring to FIGS. 2 and 3, the terminal assembly 15, which has an aperture 37, is at least partially disposed within the interlock housing 24. The terminal assembly 15 is formed by a metal shaft 38 that is secured to the core element 14 with a polymeric material 40 molded onto the portion of the core element 14. The polymeric material 40 defines the aperture 37, which is preferably in the shape of an elongated recess.

Figure 4:
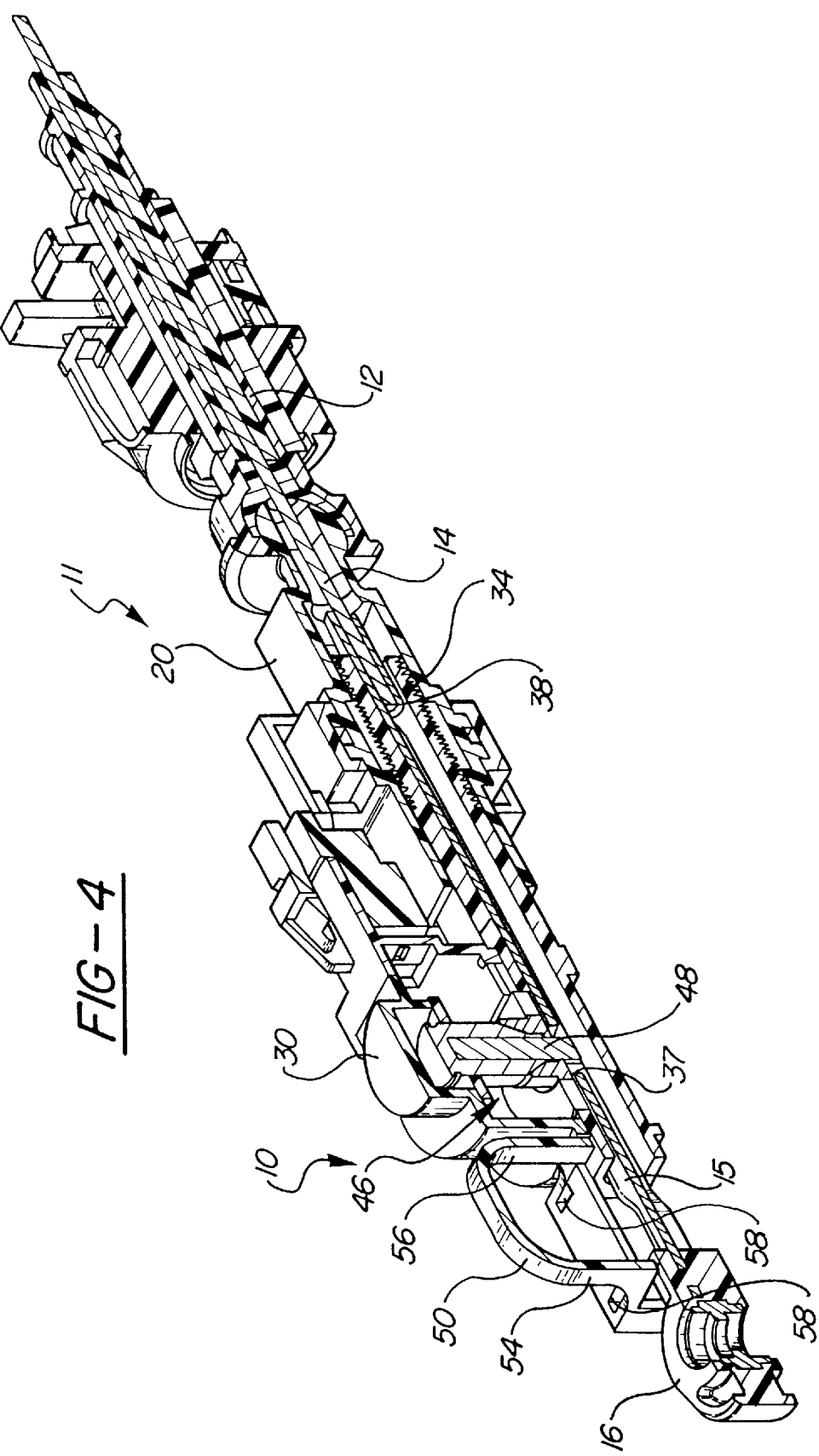
FIG. 4 is a cross-sectional view taken along lines 4—4 in FIG. 1.
Figure 4A:
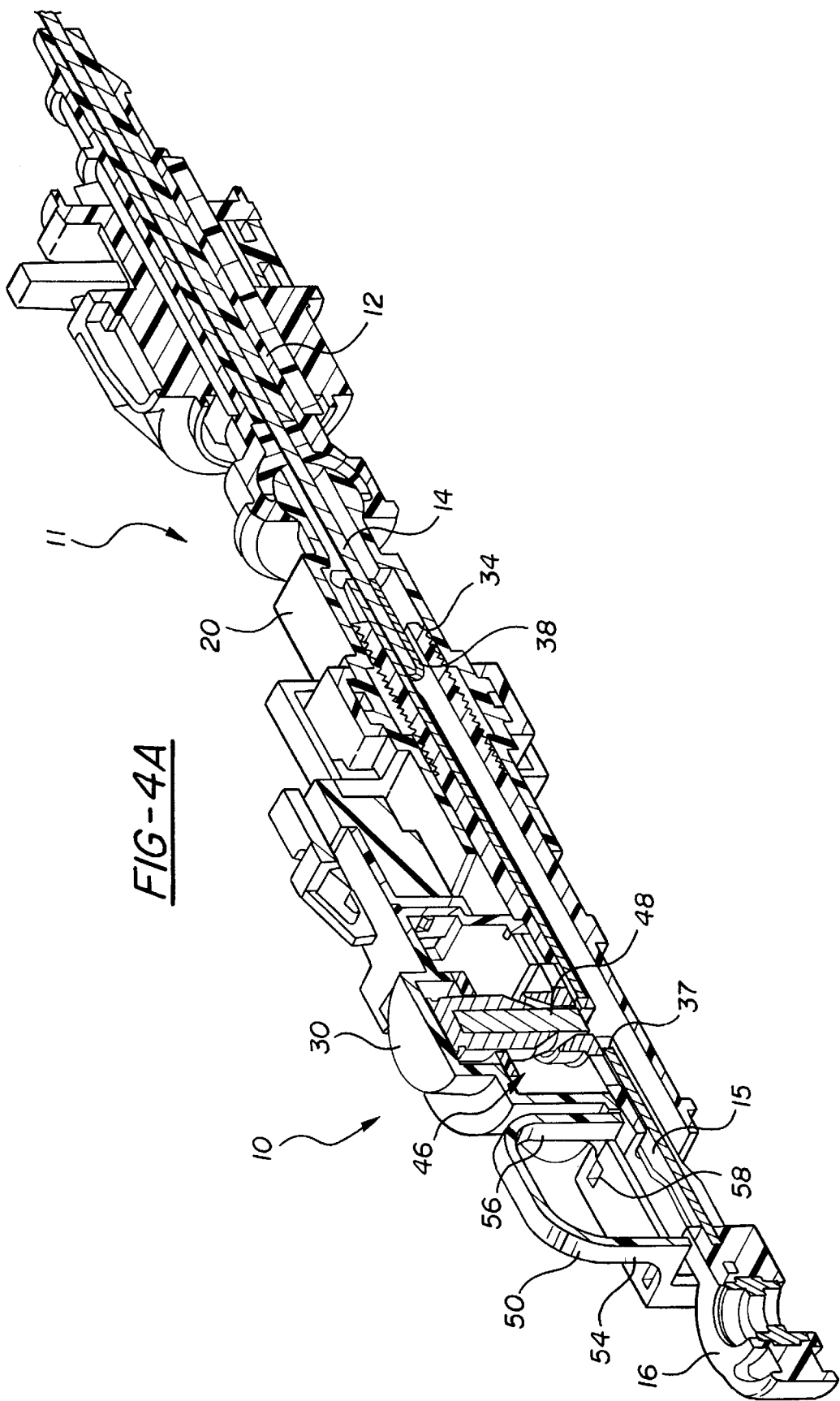
FIG. 4A is a cross-sectional view similar to FIG. 4 illustrating an interlock device in a release position.

An interlock device such as a solenoid, generally shown at 46 in FIG. 4, is disposed within the interlock housing 24. The interlock device 46 has an armature pin 48 transverse to the aperture 37 for coacting with the aperture 37 and preventing axial movement of the core element 14. Said another way, the armature pin 48 is received in the aperture 37 to prevent axial movement of the core element 14 to prevent the transmission from being shifted. To this end, the core element 14 includes a park position in which the armature pin 48 aligns with the aperture 37. Since the cable assembly 11 is adjusted upon installation into the vehicle, the core element 14 and aperture 37 tends to shift relative to the armature pin 48 thereby creating a misalignment. To prevent this condition, the present invention incorporates a removable clip 50 to preserve the alignment between the aperture 37 and armature pin 48 after installation.

The removable clip 50 retains the core element 14 in the park position. The clip 50 is interposed between the interlock housing 24 and the terminal assembly 15 to prevent relative movement and to locate the aperture 37 relative to the armature pin 48. The removable clip 50 comprises a U-shaped member defining a handle 52 and opposing legs 54 and 56, or first and second portions, depending downwardly form the handle 52 with the legs 54, 56 having receptacles 58. The interlock housing 24 and the terminal assembly 15 include tabs 60 that are received by the receptacles 58. The receptacle 58 securely engaging the tabs 60 so that the interlock housing 24 and terminal assembly 15 are not permitted to move relative to one another during installation.

The cable assemblies 11 are shipped to the assembly plant with the locks 36 in the unlocked position so that the base portion 28 may move relative to the swivel tube 20. Further, the cable assemblies 11 are shipped with the removable clip 50 secured to the interlock housing 24 and the terminal assembly 15 to maintain alignment of the aperture 37 with the armature pin 48. During installation, the first end 18 is secured to the transmission and the second end 16 is secured to the shifter. The core element 14 may move up to 15 mm within the conduit during installation. The tension is then adjusted in the cable assembly 11 by adjusting the interlock 24 and second 20 housings relative to one another. The movable lock 36 is depressed to engage the teeth 34, as shown in FIG. 5, thereby locking the interlock 24 and second 20 housings together. Once the cable assembly 11 has been properly installed and adjusted the clip 50 may be removed. By using the clip during installation, proper alignment of the aperture 37 and armature in 48 in the park position is ensured.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A cable assembly (11) comprising;
   a conduit (12) defining an axis;
   a core element (14) disposed within said conduit (12) and movable along said axis;
   a terminal assembly (15) secured to a portion of said core element (14) and having an end connector (16);
   an interlock device (46) disposed adjacent said terminal assembly (15) and movable between a release position allowing relative movement between said terminal assembly (15) and said interlock device (46), and an engaged position preventing said relative movement between said terminal assembly (15) and said interlock device (46);
   a base portion (28) extending from said interlock device (46),
   an adjustment housing (20) at least partially disposed about said base portion (28) for selectively allowing axial adjustment of said base portion (28) and said interlock device (46) relative to said adjustment housing (20) to tension said core element (14), and
   a movable lock (36) slideably supported by said adjustment housing (20) and movable between an engaged position interconnecting said adjustment housing (20) to said base portion (28) to define a fixed position of said interlock device (46) relative to said adjustment housing (20), and a disengaged position allowing relative movement between said adjustment housing (20) and said base portion (28) for providing said axial adjustment and said tensioning of said core element (14).

2. A cable assembly as set forth in claim 1 further including an interlock housing (24) supported by said cable assembly (11) with said terminal assembly (15) at least partially disposed within said interlock housing (24) and said end connector (16) of said terminal assembly (15) at least partially disposed outside of said interlock housing (24).

3. A cable assembly as set forth in claim 2 wherein said interlock device (46) is disposed within said interlock housing (24).

4. A cable assembly as set forth in claim 2 wherein said interlock housing (24) is supported by said base portion (28).

5. A cable assembly as set forth in claim 1 wherein said adjustment housing (20) is further defined as a pivotal swivel tube (20).

6. A cable assembly as set forth in claim 5 further including a mounting member (22) for supporting said cable assembly (11) wherein said swivel tube (20) is pivotally connected to said mounting member (22).

7. A cable assembly as set forth in claim 1 wherein said base portion (28) includes a first set of teeth (34) and said movable lock (36) includes a second set of teeth for engaging said first set of teeth (34) and preventing said axial adjustment of said base portion (28) relative to said adjustment housing (20).

8. A cable assembly as set forth in claim 1 further including a removable clip (50) engaging said terminal assembly (15) for locating said terminal assembly (15) relative to said interlock device (46) during an installation of said cable assembly (11).

9. A cable assembly as set forth in claim 8 wherein said removable clip (50) includes first (54) and second (56) spaced apart portions, said first portion (54) engaging said interlock device (46) and said second portion (56) engaging said terminal assembly (15).

10. A cable assembly as set forth in claim 8 further including an interlock housing (24) supported by said cable assembly (11) with said terminal assembly (15) at least partially disposed within said interlock housing (24) and said end connector (16) of said terminal assembly (15) at least partially disposed outside of said interlock housing (24).

11. A cable assembly as set forth in claim 10 wherein said removable clip (50) is interposed between said interlock housing (24) and said end connector (16).

12. A cable assembly as set forth in claim 8 wherein said removable clip (50) is interposed between said interlock device (46) and one of said end connector (16) and said adjustment housing (20).

13. A cable assembly as set forth in claim 1 wherein said terminal assembly (15) includes an aperture (37) and said interlock device (46) includes an armature pin (48) transverse to said aperture (37) such that said armature pin (48) coacts with said aperture (37) to define said release and engaged positions of said interlock device (46).

14. A cable assembly as set forth in claim 13 wherein said interlock device (46) further includes a solenoid for actuating said armature pin (48).

15. A cable assembly as set forth in claim 13 wherein said terminal assembly (15) comprises a metal shaft (38) secured to said core element (14) with a polymeric material (40) molded onto said portion of said core element (14) and said polymeric material (40) defining said aperture (37) within said terminal assembly (15).

16. A cable assembly as set forth in claim 15 wherein said aperture (37) comprises an elongated recess.

17. A cable assembly as set forth in claim 13 wherein said core element (14) includes a park position in which said armature pin (48) aligns with said aperture (37).

18. A cable assembly as set forth in claim 17 further including a removable clip (50) interposed between said interlock device (46) and said terminal assembly (15) for retaining said core element (14) in said park position during an installation of said cable assembly (11).

* * * * *